United States Patent [19]

Vertesy et al.

[11] Patent Number: 5,148,893
[45] Date of Patent: Sep. 22, 1992

[54] GEARLESS DRIVE MACHINE FOR ELEVATORS

[75] Inventors: Josef Vertesy, Luzern; Andrzej Cholinski, Ebikon, both of Switzerland

[73] Assignee: Inventio AG, Hergiswil, Switzerland

[21] Appl. No.: 736,100

[22] Filed: Jul. 26, 1991

[30] Foreign Application Priority Data

Jul. 26, 1990 [CH] Switzerland ............... 02 466/90-8

[51] Int. Cl.⁵ ............................................. B66B 11/04
[52] U.S. Cl. ........................................ 187/20; 254/362; 310/258
[58] Field of Search ............... 157/20, 27, 11; 254/362, 378, 379, 380, 392; 310/258

[56] References Cited

U.S. PATENT DOCUMENTS

| | | | |
|---|---|---|---|
| 4,355,785 | 10/1982 | Tosato et al. | 254/362 |
| 4,433,755 | 2/1984 | Ohtomi | 187/20 |
| 4,679,661 | 7/1987 | Gibson | 187/20 |
| 5,010,981 | 4/1991 | Heikkinen | 187/20 |

FOREIGN PATENT DOCUMENTS

| | | |
|---|---|---|
| 0079420 | 5/1983 | European Pat. Off. . |
| 3536464 | 8/1987 | Fed. Rep. of Germany . |
| 2500688 | 8/1982 | France . |
| 60-167645 | 8/1985 | Japan . |

*Primary Examiner*—Robert P. Olszewski
*Assistant Examiner*—Kenneth Noland
*Attorney, Agent, or Firm*—William J. Clemens

[57] ABSTRACT

A gearless drive machine for elevators has a machine frame on which are mounted a counter roller carrier, a bearing block and an end plate block. The elevator cable strand spacing can be adjusted by a counter roller coupled to the counter roller carrier, whereby both a left-hand and right-hand overhang of the counter roller is possible with the same construction of the machine frame. A main shaft is supported at two places at a drive output end by a moveable bearing mounted in the bearing block and a fixed bearing mounted in the end plate block. A drive pulley having brake disc is located between the bearings and is coupled to the main shaft by a first detachable coupling. The support of the drive pulley on both sides thereof allows great radial loads with only small deformations of the main shaft. A hoist motor supplied with alternating voltage has a stator with windings and a rotor with a rotor hub slidable onto the main shaft. A second detachable coupling at the driven end of the main shaft provides a firm connection between the main shaft and the rotor hub.

15 Claims, 3 Drawing Sheets

GEARLESS DRIVE MACHINE FOR ELEVATORS

BACKGROUND OF THE INVENTION

The present invention relates generally to a drive apparatus for elevators and, in particular, to a gearless drive machine for elevators.

There is shown in the U.S. Pat. No. 4,679,661 a drive machine of modular construction having a housing with endcaps of cylindrical shape at one end and frusto-conical shape at the other end. The frusto-conical front endcap has a tubular boss extending outwardly from its center and a shaft projects from both sides of the boss and is supported by a double roller bearing mounted in the boss. A drive pulley is attached to the outwardly projecting shaft portion at the front endcap. The end of the shaft projecting into the housing carries a not-illustrated rotor which is encompassed by a not-illustrated stator arranged in the housing to form an electric motor. The rear cylindrical endcap has a third not-illustrated bearing for supporting the inwardly projecting end of the shaft. The housing has a flange which is detachably connected with the front endcap for replacing the motor.

A disadvantage of the above-described equipment is that high bending moments are caused by the mechanical structure and must be taken into consideration in the design of the machine frame. A further disadvantage is that, due to the three bearing support of the shaft and due to the double bearing outside arrangement of the drive pulley, the bearings and the shaft are exposed to an excessively high mechanical stressing. Apart from the mechanical inadequacies, a further disadvantage is that an on-site assembly of the drive machine is not possible due to the complex mechanical construction.

SUMMARY OF THE INVENTION

The present invention concerns a gearless drive machine for elevators having a machine frame, a hoist motor having a stator and a rotor and mounted on the machine frame driving a main shaft, and a drive pulley attached to an output end of the main shaft with cable grooves for guiding the carrying cables connecting an elevator car with a counterweight. A moveable bearing and a fixed bearing supporting the main drive shaft at an output end thereof are spaced apart for mounting the drive pulley on the main shaft between the bearings. The moveable bearing is mounted in a removable bearing block and the fixed bearing is mounted in an end plate block, the blocks being attached to the machine frame. The main shaft has a free end and the hoist motor has an overhung rotor which is detachably coupled to the free end of the main shaft.

A counter roller carrier is mounted on the machine frame and the elevator cable strand spacing can be adjusted by a counter roller coupled to the counter roller carrier, whereby both a left-hand and right-hand overhang of the counter roller is possible with the same construction of the machine frame. The drive pulley has a brake disc formed thereon and is coupled to the main shaft by a first detachable coupling. The support of the drive pulley on both sides thereof allows great radial loads to be supported with only small deformations of the main shaft. A second detachable coupling at the driven end of the main shaft provides a firm connection between the main shaft and a rotor hub.

The gearless drive machine according to the present invention solves the problem of avoiding the disadvantages of the known drive equipment and permits a kit-like assembly of the individual machine parts with the usual hand tools.

The advantages achieved by the present invention include a compact modular mode of construction for gearless drive machines in the average and upper load range and fed by power supplies such as a frequency converter. Such machines permit great radial loads at the drive pulley, different motor sizes, simple motor assembly and left-hand or right-hand overhang of the counter roller with the same machine frame construction.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
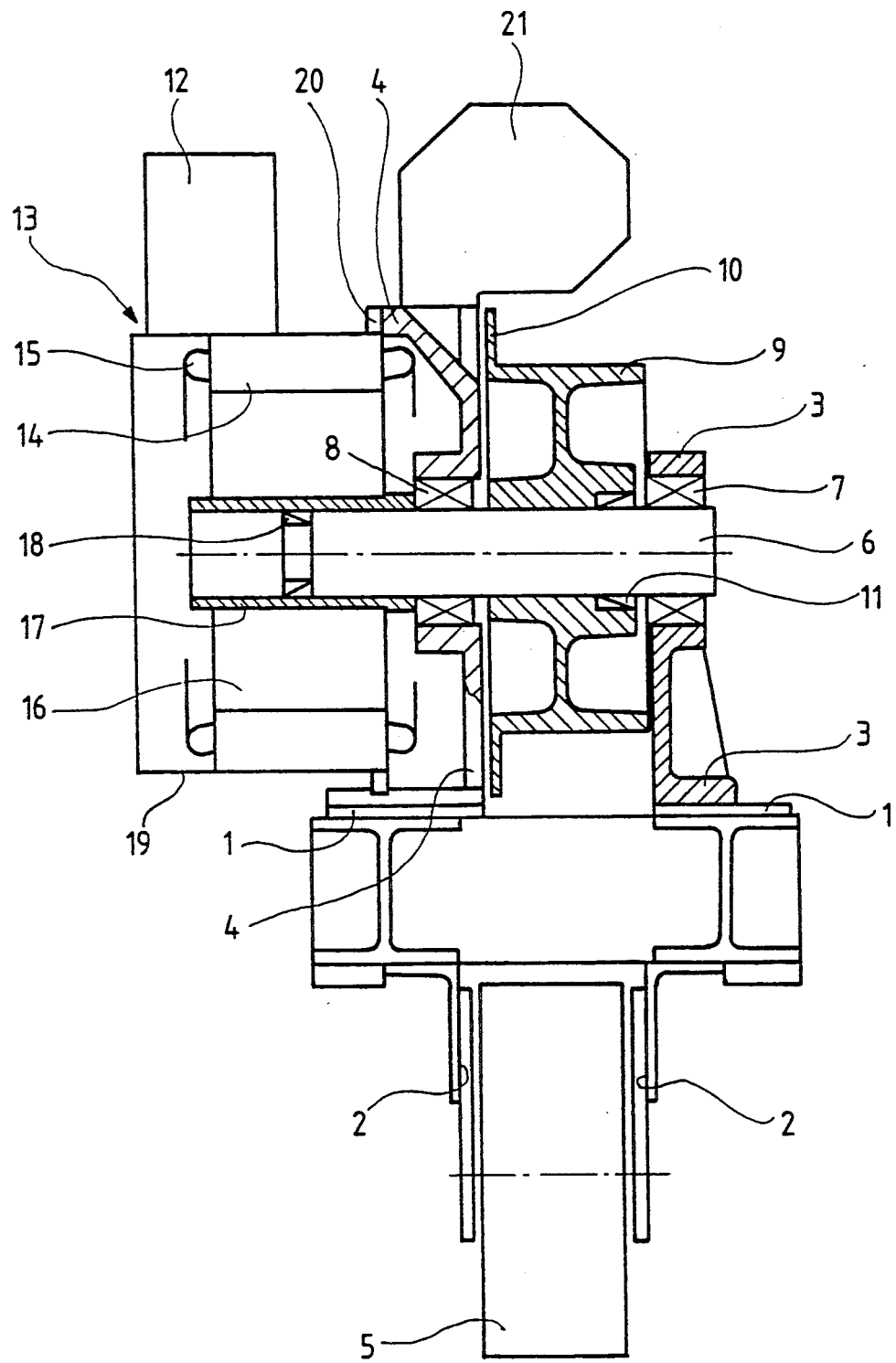
FIG. 1 is a side elevational schematic view, in cross section, of a drive machine according to the present invention.

In the FIGS. 1 through 5, there is shown a machine frame 1 having attached thereto a counter roller carrier 2, a bearing block 3 and an end plate block 4. An adjustable cable strand spacer can be formed by the machine frame 1 and a counter roller 5 positioned at the counter roller carrier 2, whereby a left-hand and a right-hand overhang of the counter roller 5 is possible with the same machine frame construction. A main shaft 6 is supported at two spaced apart points at the drive output end by an axially moveable bearing 7 located in the bearing block 3 and a fixed bearing 8 located in the end plate block 4. Mounted between the bearing locations is a drive pulley 9 having a radially outwardly extending brake disc 10, which a not-illustrated disc brake engages, and which contributes to the compact mode of construction of the drive machine. The drive pulley 9 is releasably attached to the main shaft 6 by a first detachable coupling 11. The fixed bearing 8 in the end plate block 4 and the moveable bearing 7 in the bearing block 3 assure a simple disassembly of the bearing block 3 and thereby also a simple exchange of the drive pulley 9. The support of the main shaft 6 on both sides of the drive pulley 9 permits large radial loads with only small deformations of the main shaft 6. Furthermore, different motor sizes can be attached at the driving side of the machine frame 1 utilizing the same mechanical construction.

A hoist motor 13, supplied with alternating voltage through a terminal box 12, includes a stator 14 with windings 15 and an overhung rotor 16 with a rotor hub 17 mounted on the main shaft 6. A second detachable coupling 18 located at the driven end of the main shaft 6 provides a firm connection between the main shaft 6 and the rotor hub 17. A cowling 19 carrying the terminal box 12 envelopes the stator 14 and is fastened to the end plate block 4 by a forward flange 20 formed at an open end thereof. A fan 21 is provided for the cooling of the hoist motor 13 and the fixed bearing 8 and, like the terminal box 12, is mounted between the ends of the machine which in turn contributes to a compact construction of the machine.

Figure 2:
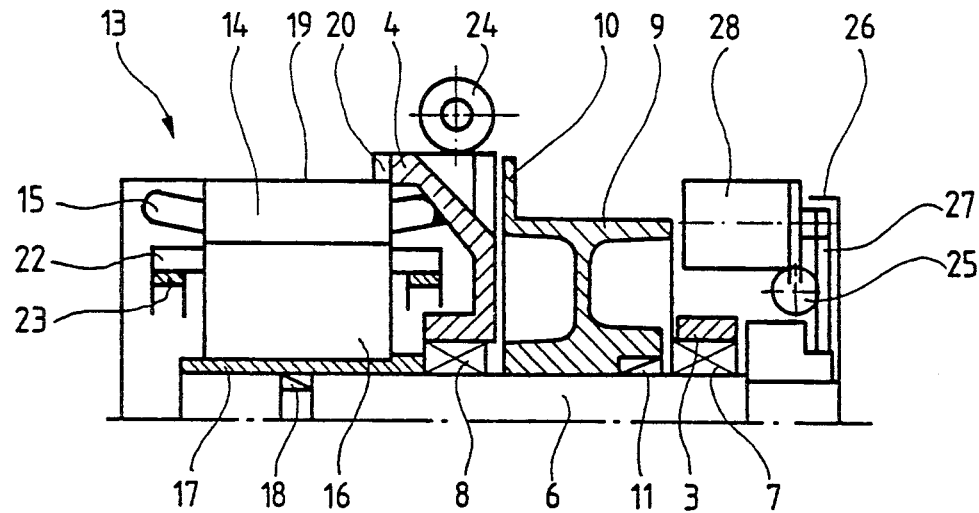
FIG. 2 is a side elevation schematic view, in cross section, showing details of the drive machine shown in the FIG. 1.

The FIG. 2 shows further details of the drive machine illustrated in the FIG. 1. The overhung rotor 16 of the hoist motor 13 includes a plurality of short-circuit bars 22 which are positioned about the circumference of the rotor and the ends of which are connected by a pair of shirt-circuit rings 23. A prerequisite for an overhung configuration of the rotor 16 is a short length hoist motor 13 of large diameter. The construction of the hoist motor 13, in particular of the overhung rotor 16, results in advantageous effects in respect of the separate assembly of the stator and the rotor as well as simple assembly and good accessibility in the case of a motor exchange. A suspension eye 24 attached to the end plate block 4 and facilitates the one-piece on-site assembly of the drive machine. A manual drive 25 acting on the main shaft 6 through a not-illustrated worm gear enables a manual movement of the main shaft 6 if a power failure occurs. A belt 27 guided under a cover 26 transmits the rotational movement of the main shaft 6 to a pulse generator 28, which generator produces pulses the number of which is dependent on the rotational movement and which are fed to a motor control as the actual rotational speed value.

Figure 3:
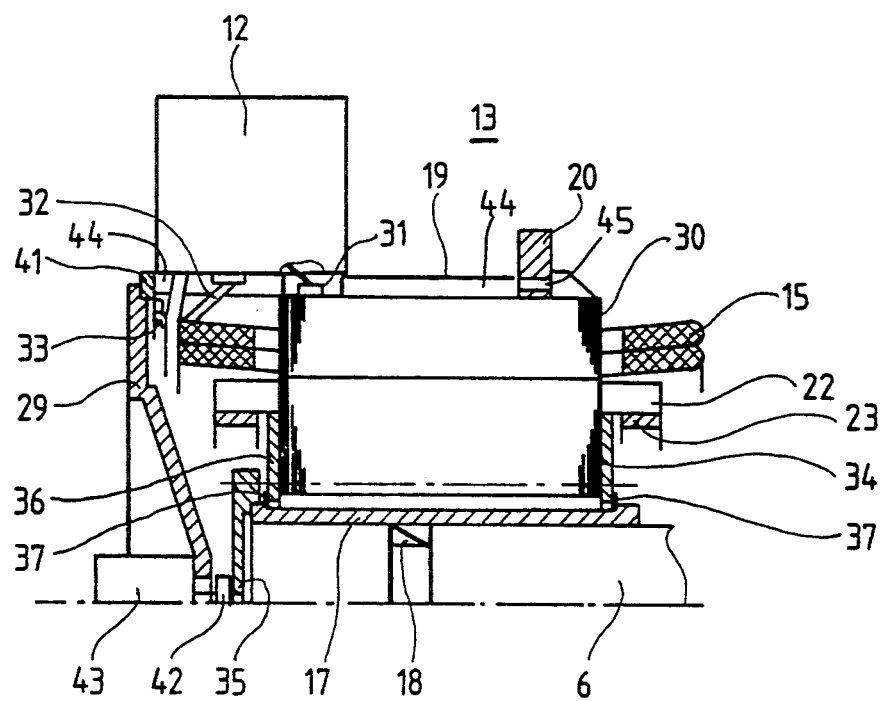
FIG. 3 is a side elevation schematic view, in cross section, showing details of the hoist motor shown in the FIGS. 1 and 2.

The hoist motor 13 is shown in longitudinal section in the FIG. 3 and a motor end plate 29 in conjunction with a rearward flange 41 terminates the interior motor space in the cowling 19 at the rear end thereof. Provided in the center of the motor end plate 29 is an opening for mounting a rotary pulse generator 43, which generator is driven by an intermediate flange 35 on the hub 17 coupled through a clutch 42. A plurality of U-shaped sheet metal profiles 44 which are distributed about and extend in an axial direction over the circumference at the surface of a lamination stack 30. The profiles are connected with the lamination stack 30 and connect the forward flange 20 with the rearward flange 41. The cowling 19 closes the strip-shaped gaps between the U-shaped sheet metal profiles. The hollow spaces between the lamination stack 30 and the U-shaped sheet metal profiles 44 as well as the hollow spaces between the lamination stack 30 and the cowling 19 serve as air channels. Cutouts or apertures 45, which assure the passage of the fan generated air current, are provided in the forward flange 20.

A temperature monitor 31 located at the surface of the lamination stack 30 protects the hoist motor 13 against overheating. Connecting conductors 32 extend from the terminal box 12 to feed electric power to the windings 15 laid into slots formed in the lamination stack 30. A protective conductor 33 leads dangerous contact voltages arising through insulation defects away from the metallic parts of the hoist motor 13. A plurality of rotor laminations 34 mounted on the tubular rotor hub 17 are compressed into the rotor lamination stack 30 by the intermediate flange 35 and a pair of pressure plates 36 fastened by securing rings 37 on the rotor hub 17. The shirt-circuit bars 22, which are laid into not-illustrated grooves at the circumference of the rotor lamination stack 30, are connected at the front and rear ends each with a respective one of the short-circuit rings 23. Through the use of a tubular construction for the rotor hub 17, a rotor assembly independent of the main shaft 6 is possible. The rotor hub 17 simplifies the assembly of the rotor 16 on the main shaft 6 in that merely the rotor hub 17 is pushed onto the main shaft 6 and the second detachable coupling 18 is tightened. The same procedure in the opposite sense applies for the disassembly of the rotor 16.

Figure 4:
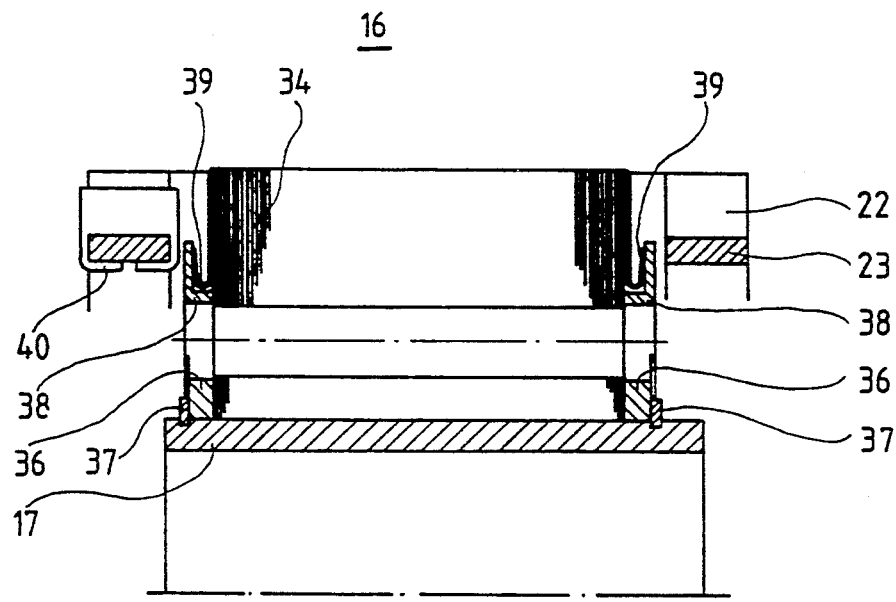
FIG. 4 is a side elevation schematic view, in cross section, showing details of the laminated rotor of the motor shown in the FIG. 3.

The FIG. 4 shows details of the fastening of the rotor laminations 34 and of the balancing of the rotor 16. Provided for each rotor end face is one of the pressure plates 36, which plates at the circumference thereof have an L-shaped end which serves as a spline carrier 38. As an alternative to expensive end laminations, a J-shaped key 39 is pressed into the space between the spline carrier 38 and the stack of the laminations 34 with the longer straight part thereof against the outermost one of the rotor laminations 34. The bent-up end of the key 39 detents with the long leg of the spline carrier 38. The key 39 prevents noises brought about by flapping rotor laminations and fatigue fractures of the rotor laminations 34. A metal balancing plate 40 located at each of the short-circuit rings 23 compensate for rotor imbalances. The balancing plates 40 are formed with a generally rectangular cross section having two free legs. The plates 40 are positioned parallel to the ends of the short-circuit bars 22 onto the short-circuit ring 23 and the free legs are bent in an axial direction around the short-circuit ring 23.

Figure 5:
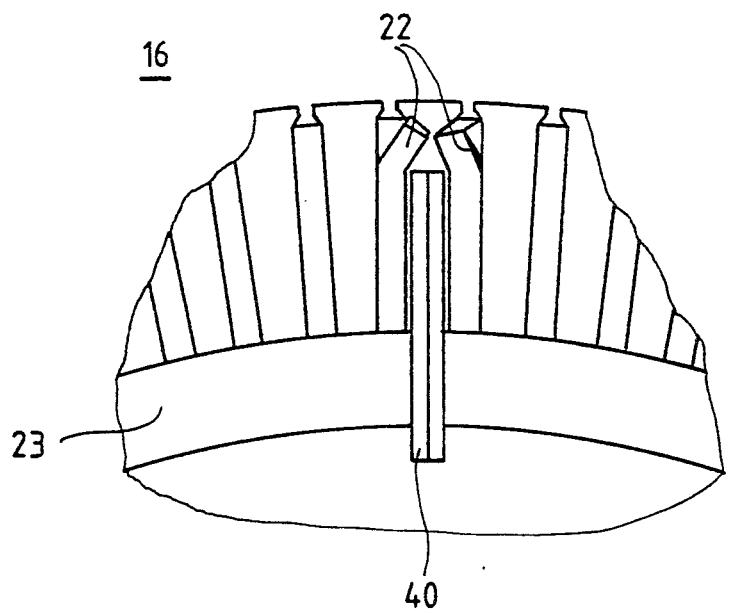
FIG. 5 is a fragmentary end elevation view of the rotor shown in the FIG. 4.

The FIG. 5 shows the details of the assembly of the metal balancing plates 40. The rotor 16 is shown in rear or front elevation with two of the metal balancing plates 40 inserted between the ends of two adjacent short-circuit bars 22. The free ends of the plates 40 are bent over the underside of the short-circuit ring 23. The metal balancing plates 40 are secured in place by bending the ends of the short-circuit bars 22.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. In a gearless drive machine for elevators having a machine frame, a hoist motor having a stator and a rotor and mounted on the machine frame driving a main shaft, a drive pulley attached to an output end of the main shaft with cable grooves for guiding the carrying cables connecting an elevator car with a counterweight, the improvement comprising: a moveable bearing and a fixed bearing supporting a main drive shaft at an output end thereof, said bearings being spaced apart for mounting a drive pulley on said main shaft between said bearings, said bearings being attached to a machine frame, said main shaft having a free end, and a hoist motor mounted on said machine frame and having an overhung rotor, said rotor being detachably coupled to said free end of said main shaft.

2. The gearless drive machine according to claim 1 wherein said moveable bearing is mounted in a removable bearing block and said fixed bearing is mounted in an end plate block, said blocks being attached to said machine frame.

3. The gearless drive machine according to claim 1 wherein said drive pulley is slidable onto said main shaft and is firmly connected to said main shaft by a detachable coupling.

4. The gearless drive machine according to claim 1 wherein said drive pulley has a brake disc formed thereon for engaging a disc brake for stopping the elevator car.

5. The gearless drive machine according to claim 1 wherein said stator has a forward flange formed thereon and said fixed bearing is mounted in an end plate block attached to said machine frame, said flange being attached to said end plate block.

6. The gearless drive machine according to claim 5 including a rearward flange formed on said hoist motor and at least one generally U-shaped sheet metal profile attached to said stator and extending in an axial direction, said forward flange and said rearward flange being connected by said profile.

7. The gearless drive machine according to claim 5 including at least one aperture formed in said forward flange for the passage of air in at lest one hollow space serving as an air channel, said hollow spaced being formed by said stator, a U-shaped sheet metal profile attached to a circumference of said stator and a cowling enclosing said stator and said profile.

8. The gearless drive machine according to claim 1 wherein said overhung rotor has a rotor hub which is slidable onto said free end of said main shaft and is firmly attached to said free end by a detachable coupling.

9. The gearless drive machine according to claim 1 including a pair of pressure plates each having a spline carrier formed thereon and located at opposite end faces of said overhung rotor.

10. The gearless drive machine according to claim 9 wherein said spline carrier is generally L-shaped and including a plurality of J-shaped keys, each of said keys having a bent-up end cooperating with a longer leg of said L-shaped spline carrier for the retention of an outermost rotor lamination of said overhung rotor.

11. The gearless drive machine according to claim 9 wherein said overhung rotor has a plurality of axially extending short-circuit bars and a pair of short-circuit rings connecting located at opposite ends of said overhung rotor and connecting ends of said bars and including a plurality of metal balancing plates mounted on said short-circuit rings, said plates each having free legs bent around said short-circuit rings whereby said plates are retained for securing bent together ends of said short-circuit bars.

12. The gearless drive machine according to claim 1 wherein said hoist motor includes a motor end plate for terminating an interior motor space at a rear end of said hoist motor, a rearward flange formed on said hoist motor and being attached to said end plate, a rotary pulse generator located at a center of said end plate, an intermediate flange formed on said hoist motor, and a clutch coupling said generator for rotation to said intermediate flange.

13. A gearless drive machine for elevators comprising:
- a machine frame;
- a main shaft having a free end and an output end;
- a hoist motor having a stator and an overhung rotor, said hoist motor being mounted on said machine frame for driving said free end of said main shaft, said overhung rotor being detachably coupled to said free end of said main shaft;
- a drive pulley attached to said output end of said main shaft with cable grooves for guiding carrying cables connecting an elevator car with a counterweight;
- a moveable bearing and a fixed bearing supporting said main shaft at said output end thereof, said bearings being spaced apart for mounting said drive pulley on said main shaft between said bearings;
- a bearing block attached to said machine frame and mounting said moveable bearing; and
- an end plate block attached to said machine frame and mounting said fixed bearing.

14. The gearless drive machine according to claim 13 wherein said drive pulley is slidable onto said main shaft and is firmly connected to said main shaft by a detachable coupling.

15. The gearless drive machine according to claim 13 including a forward flange formed on said overhung stator and attached to said end plate block, a motor end plate for terminating an interior motor space at a rear end of said hoist motor, a rearward flange formed on said hoist motor and being attached to said end plate, a rotary pulse generator located at a center of said end plate, an intermediate flange formed on said hoist motor, and a clutch coupling said generator for rotation to said intermediate flange.

* * * * *